Nov. 5, 1940.  H. C. JOHNSON  2,220,372
JUICE EXTRACTOR
Filed July 22, 1938

Inventor:
Herbert C. Johnson
By Davis, Lindsey, Smith & Shonts Atty.

Patented Nov. 5, 1940

2,220,372

UNITED STATES PATENT OFFICE 2,220,372

JUICE EXTRACTOR

Herbert C. Johnson, Wilmette, Ill.

Application July 22, 1938, Serial No. 220,741

3 Claims. (Cl. 100—42)

My invention relates to juice extractors and it has to do particularly with a device especially suited for domestic use in extracting the juices of fruits such as lemons, oranges, grapefruit, and the like.

One of the objects of my invention is to provide an improved juice extracting device which is of simple, sturdy and inexpensive construction and which may be readily actuated to extract substantially all of the juice from the fruit.

Another object is to provide an improved squeeze unit which includes a readily removable juice-receiving cup that is adapted to support a readily removable squeezer member.

A further object is to provide an improved squeeze member upon which the fruit is supported in receiving the thrust of a movable squeeze member, which improved squeeze member is provided with fruit contacting surfaces that engage and retain the fruit in such a way that practically all of the juice thereof is extracted without seeds, pulp and the like being deposited in the juice-receiving cup along with the juice.

Additional objects are to provide improved means for supporting the fruit supporting squeeze member upon the juice-receiving cup, the arrangement being such that such squeeze member may be removed from the cup without contacting the juice-extracting surfaces of the parts thereof; to provide a compact structure that may be stored in a small space; and to provide a sanitary device embodying but few parts, all of which may be easily and quickly cleaned.

Other objects and advantages will become apparent as this description progresses and by reference to the drawing wherein—

Figure 1:
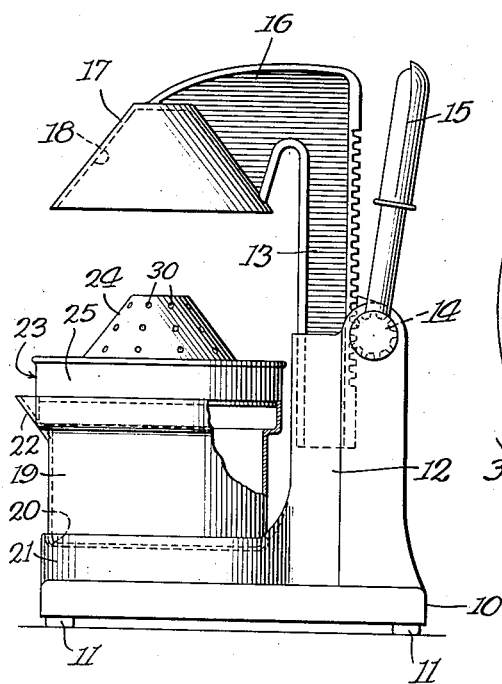
Figure 1 is a side elevational view of a juice-extracting device embodying my invention.
Figure 2:
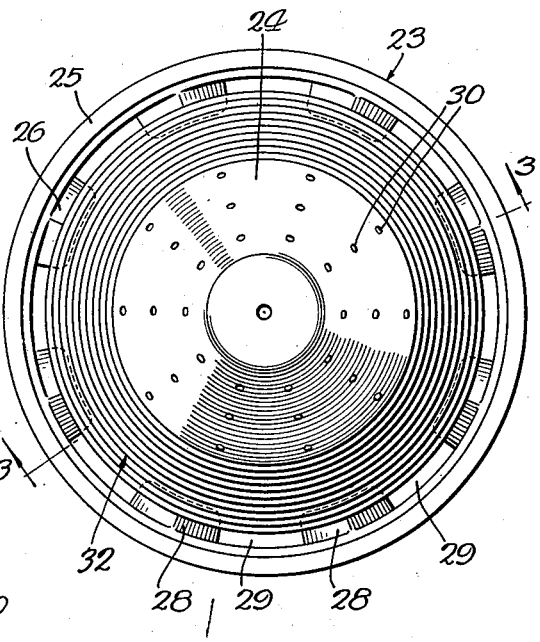
Fig. 2 is an enlarged top plan view of the lower or stationary squeeze unit shown in Fig. 1.
Figure 3:
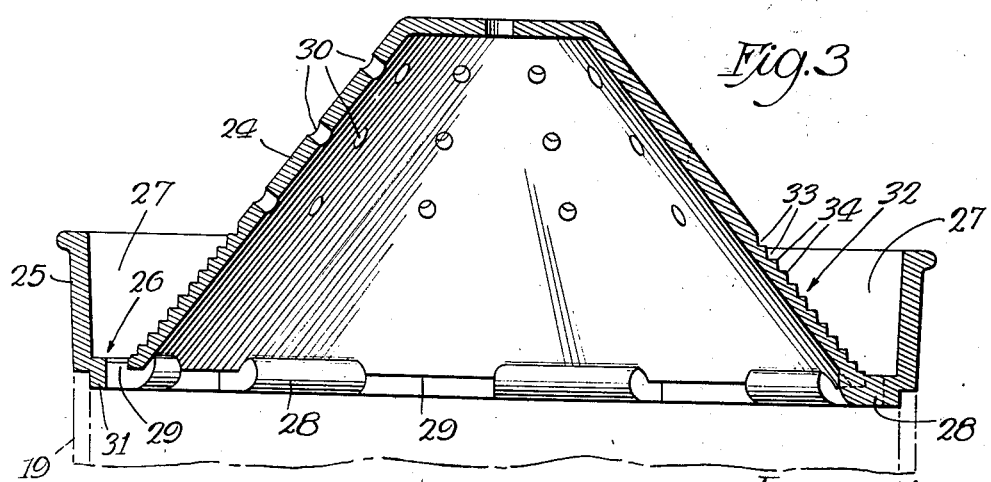
Fig. 3 is an enlarged section taken substantially on line 3—3 of Fig. 2.

The juice extractor shown in the drawing includes a base 10 which may be generally rectangular in shape and which is provided at the corners of its bottom with rubber, or the like, feet 11. The base is provided at its rear side with an upstanding tubular portion 12 in which is received a rack bar 13 adapted to be reciprocated by a pinion 14 which is, in turn, operated by a handle 15. The upper end of the rack bar 13 is provided with a laterally extending integral arm 16 which overhangs the base 10 and which supports an integral frusto-conical squeeze member 17. The squeeze member 17 is provided with an internal frusto-conical squeeze surface 18 which is adapted to engage the fruit and which, in cooperation with a stationary squeeze member, to be described hereinafter, serves to extract the juice from the fruit.

My invention is concerned mainly with an improved form of stationary squeeze unit having a squeeze member cooperating with the upper squeeze cone or member 17. Specifically, the stationary squeeze unit includes a circular juice-receiving cup 19, the bottom portion of which fits in and is retained in a circular recess 20 formed in an upstanding cylindrical part 21 on the base 10. This cup 19 is provided with a spout 22 at its upper end to facilitate pouring of the fruit juice therefrom. The squeeze unit further includes a stationary squeeze member 23 which is removably supported by the cup 19.

The squeeze member 23 takes the form of a frusto-conical squeeze element 24 shaped complementally to the squeeze surface 18 of the movable squeeze member 17 and upon which the fruit from which the juice is to be extracted is adapted to rest. The squeeze element 24 is provided with an integral, cylindrical, upstanding skirt portion 25 laterally spaced from the lower edge of the squeeze element 24 by a bridge portion 26 whereby the lower part of the squeeze element 24 and the skirt 25 form, in effect, a trough-like space 27. The bridge portion 26 takes the form of a plurality of integral and uniformly spaced-apart and thickened ribs 28. These ribs constitute a reinforced integral connection between the squeeze element 24 and the skirt 25 so that the device will fully withstand the squeeze pressures applied to the squeeze unit through the movable squeeze member 17. Also, by spacing apart the rib portions 28, the bridge 26 or the bottom of the space 27 is provided with an annular series of openings 29 through which juices may find their way into the cup 19. The upper part of the squeeze element 24 is further provided with a plurality of openings 30 through which the extracted juice may also find its way into the cup 19.

Sanitation is of primary importance in devices of the foregoing character. The parts contacted by the fruit juice should be of simple construction that may easily be cleaned, they must be easily removable, and they should be constructed and arranged to encourage their cleaning. To the foregoing end, and as above stated, the stationary fruit supporting squeeze member 23 is directly supported by the cup that receives the juice. This, obviously, encourages detachment of the squeeze member 23 in emptying the cup 19 of the extracted juices. In carrying out my invention, I support the squeeze member 23 directly upon the upper circular edge of the cup 19 so that the squeeze pressures are applied axially and endwise through the cup walls. The squeeze member skirt 25 has an outside diameter substantially the same as the outside diameter of the cup 19 so that when the squeeze member 23 is mounted upon the cup, the cup skirt constitutes, in effect, a continuation of the cup wall. The bottom edge of the skirt 25 is provided with an inwardly or radially off-set circular flange 31, the outside diameter of which is substantially the same as the inside diameter of the side wall of the cup 19. The flange 31 fits within the upper edge of the cup 19 and serves to positively retain the squeeze unit 23 against lateral displacement in any direction. In the use of the foregoing structure, while the squeeze unit 23 is positively retained in position upon the cup, it may readily be removed by merely grasping the upstanding skirt 25, and this may be done without the hands of the user touching the squeeze surface of the squeeze element 24.

The squeeze element 24 is so constructed and arranged that it facilitates the removal of all of the juices from the fruit and tends to prevent seeds from finding their way with the juice into the cup 19. To the foregoing end, the upper portion of the squeeze element 24, preferably down to a point substantially in line with the top edge of the skirt 25, is provided with a smooth exterior surface. This is the surface upon which the fruit is initially pressed and from which the fruit juices are drained mainly through the openings 30. The lower portion of the squeeze element 24, and preferably that part below the top edge of the skirt 25, is provided with a corrugated or washboard-type surface 32. This surface takes the form of a plurality of concentric, right-angled grooves 33 extending circumferentially around the squeeze element 24 and providing a plurality of concentric, sharp ridges 34 which extend entirely to the bottom of the squeeze element 24. The ridges 34 are so located that they engage the advancing surfaces of the fruit as the squeezing operation takes place, thereby applying a sort of rubbing action to the fruit. This action tends to extract any juices that may remain in the fruit at that point and which may not be extracted by the mere nesting of the squeeze members. For example, in extracting juice from an orange, the orange is cut in half and it may be of such size that the cut edge portion, due to the size of the orange, will project beyond the lower squeeze edges of the squeeze member 17. If that happens, the scrubbing surface 32 will tend to remove any juices that find their way into that projecting portion of the fruit. Furthermore, the portion 32 tends to dig into the engaged part of the fruit in such a way as to minimize any tendency of seeds to pass the squeeze element 24 at that point so that the possibility of seeds finding their way into cup 19 is practically eliminated.

The operation and advantages of my invention will be apparent from the foregoing description. A juice extractor embodying my invention is simple in construction, sturdy and compact; may be operated easily and quickly to extract the fruit juices; is highly efficient in its juice-extracting operation; and is of a sanitary character which encourages sanitation in the use of the same.

I claim:

1. In a juice-extracting device, a stationary fruit-supporting squeeze member, another squeeze member movable toward and from said stationary squeeze member, said stationary squeeze member having a frusto-conical squeeze element provided with a smooth upper portion having a plurality of openings therein through which fruit juices are adapted to drain into a receptacle, and a lower imperforate portion having a plurality of angular notches dividing the surface into a plurality of spaced concentric ridges that serve as a fruit scrubbing surface, said movable squeeze member having a squeeze socket shaped complementally to said squeeze element and in which the latter is received during the squeezing operation.

2. A squeeze member for a device of the character described which comprises an annular squeeze element having a top wall and a side wall extending outwardly and downwardly therefrom, the upper portion of said side wall being smooth and having juice drainage openings therein, the lower portion of said side wall being imperforate and provided throughout with spaced concentric circumferential ridges, a cylindrical skirt surrounding the lower portion of said squeeze element, and a horizontal perforated bridge integrally joining the lower edges of said side wall and skirt, said skirt providing a guard against juice deflection as well as a hand grip by which the squeeze member may be handled without contacting the juice extracting surfaces thereof.

3. A squeeze member for a juice-extracting device which comprises a frusto-conical squeeze element having upper and lower squeeze surfaces, the upper of said surfaces being relatively smooth to permit the free flow of fruit juices and provided with a plurality of openings through which fruit juices are adapted to drain and the other surface being inperforate and having a plurality of annular notches dividing the surface into a plurality of axially spaced annular ridges that serve as fruit-scrubbing surfaces and are adapted to retain the lower juice containing portions of fruit in position to receive sufficient squeezing force so as to extract juice therefrom.

HERBERT C. JOHNSON.